(12) United States Patent
Nagano et al.

(10) Patent No.: US 6,289,170 B1
(45) Date of Patent: Sep. 11, 2001

(54) VIDEO DEVICE WITH AN ELECTRONIC PROGRAM GUIDE DECODER

(75) Inventors: Kae Nagano; Noboru Motoyoshi, both of Tokyo; Tomoyuki Hanai, Kanagawa; Kenji Hamamoto, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/449,035

(22) Filed: Nov. 24, 1999

Related U.S. Application Data

(63) Continuation of application No. 08/759,430, filed on Dec. 5, 1996, now abandoned.

(30) Foreign Application Priority Data

Dec. 6, 1995 (JP) .................................................. 7-344317

(51) Int. Cl.[7] .................................................... H04N 5/91
(52) U.S. Cl. ................. 386/83; 348/906; 725/39
(58) Field of Search ............................ 358/906; 386/83, 386/1; 725/39, 59, 40, 56, 41, 48; 348/906, 114, 565, 553, 478; 360/69, 20, 18

(56) References Cited

U.S. PATENT DOCUMENTS

| | | | |
|---|---|---|---|
| 4,288,809 | * 9/1981 | Yabe | 348/468 |
| 4,390,901 | * 6/1983 | Keiser | 348/465 |
| 4,706,121 | * 11/1987 | Young | 348/825.22 |
| 4,751,578 | * 6/1988 | Reiter et al. | 348/564 |
| 5,038,211 | * 8/1991 | Hallenbeck | 348/460 |
| 5,161,019 | * 11/1992 | Emanuel | 348/565 |
| 5,293,357 | * 3/1994 | Hallenbeck | 386/83 |
| 5,515,173 | * 5/1996 | Mankovitz et al. | 360/69 |
| 5,790,202 | * 8/1998 | Kummer et al. | 348/553 |

* cited by examiner

*Primary Examiner*—Andrew L. Sniezek
(74) *Attorney, Agent, or Firm*—Frommer Lawrence & Haug LLP.; William S. Frommer; Gordon Kessler

(57) ABSTRACT

A reproducing device provided with at least a reproduction apparatus and a decoding apparatus with decoding transmitted electronic program guide data is provided, and includes a switcher for switching between an antenna received signal and an internally generated signal, and a channel switcher for switching a channel of a display apparatus. When an electronic program guide display request is made, the switcher is automatically switched to the internally generated signal, which is then output on a predetermined channel having a predetermined frequency. Additionally, the channel of the display apparatus to which the internally generated signal is applied is also automatically switched to the predetermined channel number having the predetermined frequency by the channel switcher thus to allow for the display of the electronic program guide. The invention is similarly applicable to a reproduction device also having a recording feature.

23 Claims, 7 Drawing Sheets

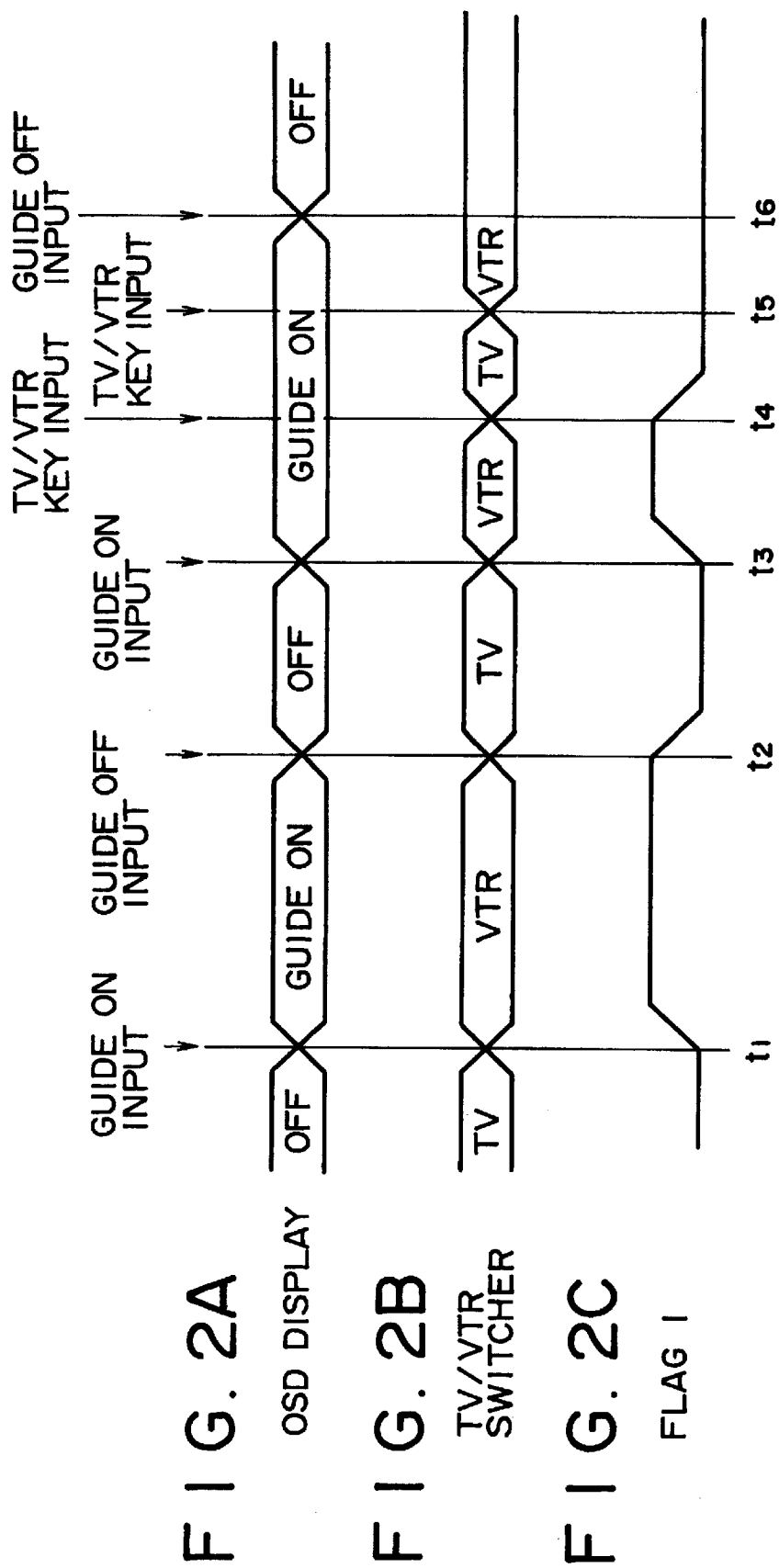

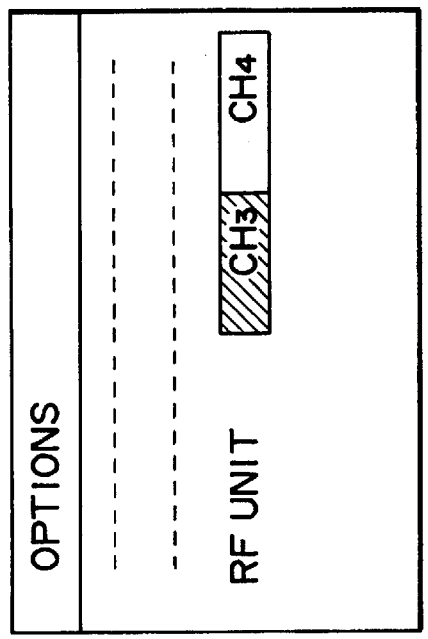
FIG. 3
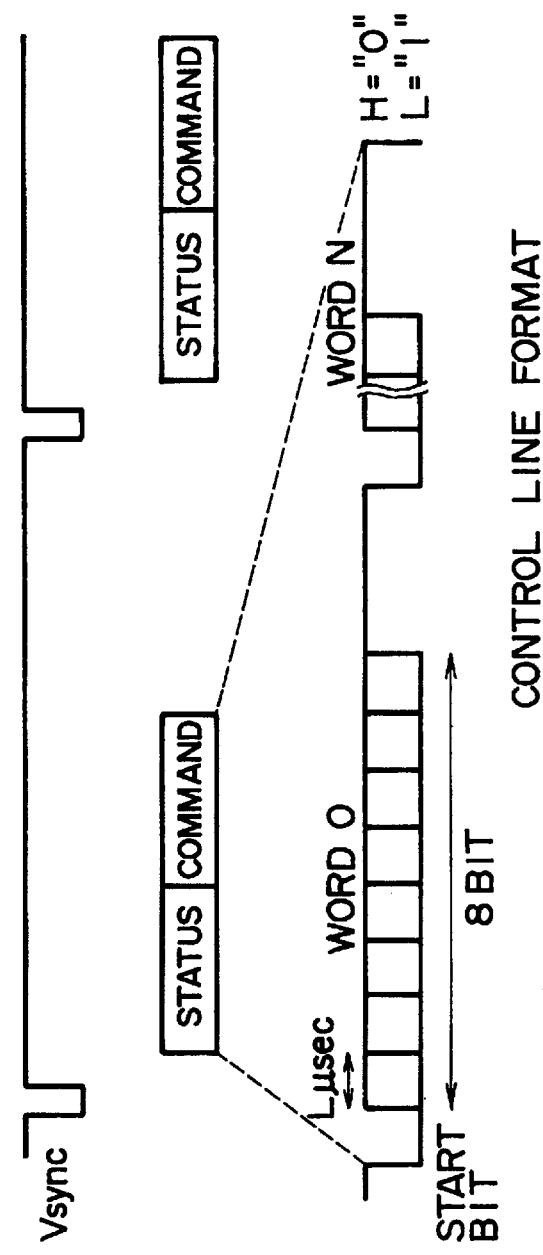
FIG. 4A
FIG. 4B
FIG. 4C

TV/VTR SWITCHING USING LUMINESCENCE UNIT

FIG. 6B
(PRIOR ART)

| PROGRAM GUIDE | | |
|---|---|---|
| SEP 7 | 8:00PM | 9:00PM |
| CSP2 | NEWS 1 | NEWS 2 |
| 26 | FAMOUS AMERICAN | |
| CNN | PRIMENEWS | |
| SHOW | CITY SLICKERS | |
| HBO | BINGO | |

VIDEO DEVICE WITH AN ELECTRONIC PROGRAM GUIDE DECODER

The present application is a continuation of application Ser. No. 08/759,430 filed Dec. 5, 1996 now abandoned.

BACKGROUND OF THE INVENTION

The present invention relates to a video device having an electronic program guide decoder, capable of reproducing or recording and reproducing a video signal.

A video tape recorder (VTR) conventionally known is capable of reproducing video signals and audio signals recorded on a magnetic tape to display video on a television set. Also, some VTRs have also recording a and reproducing functions capable of recording video signals and audio signals on a magnetic tape.

In addition, there is known a video device for recording and reproducing video signals and audio signals in addition to VTR.

In such a video device, antenna receiving signals received by an antenna are generally inputted, and a desired channel can be selected from among these antenna receiving signals for reception. The receiving signals are transmitted to a television set, or are demodulated and used for recording.

The user selects a desired channel program from among channel programs broadcast to view through television or record in a video device, but at this time, the program is generally selected while seeing a program table.

When, however, there are as many channels broadcast as 150 channels, it is not easy to search a program table, on which programs for, for example, 150 channels are printed, for a desired program.

Thus, in order to enable a desired program to be easily searched for, data of a program table for each channel is inserted in a vertical blanking interval for video signal for a specified channel for transmission not to cause any obstruction to the television signals. The program table transmitted is caused to be displayed on a television set, whereby the user searches for the channel while seeing the television screen to select his desired channel program.

This program table data is called an electronic program guide, and the electronic program guide can be divided into each kind of programs such as sports, news, and movies, to be displayed on the screen. Also, it is arranged that a program can be selected from the displayed screen of this electronic program guide for reception, and that videotape reservation for the program can be made.

FIG. 6B shows an example of the program guide screen of the electronic program guide displayed on the television set. Its first step column shows the title of the program guide screen, and is displayed as "Program Guide". The second step column shows month and day, and the month and day of SEP 7 and two grids showing time of 8:00 pm and 9:00 pm are shown. In columns of the third step and subsequent steps, a channel is shown at the left end, and the names of the programs to be broadcast on the month and day, displayed on the second step, and at the time indicated by the grids are displayed correspondingly to this channel on the right side. It is indicated that in, for example, Channel CSP2, NEWS1 is broadcast for 1 hour from 8:00 pm, and NEWS2 is broadcast from 9:00 pm. Also, it is indicated that in Channel 26, a program of Famous American is broadcast for two hours from 8:00 pm.

FIG. 6A is a block diagram showing the structure of a VTR having a function of receiving such an electronic program guide for decoding.

In the VTR shown in FIG. 6A, a television broadcast signal received by an antenna 101 is inputted in a tuner circuit 111. A video signal of a channel selected from the tuner circuit 111 by the user is inputted in a videotape unit (not shown), and is inputted to a microcomputer device ($\mu$con) 113. The $\mu$con 113 has a slice/decode circuit 113-1, and a video signal from the tuner circuit 111 is inputted to the slice/decode circuit 113-1 of $\mu$con 113.

A remote control signal received by an infrared light reception unit 114 is inputted to the $\mu$con 113, which controls in various ways in response to the remote control signal. In this respect, the infrared light, which transmits the remote control signal, is transmitted from a remote control transmitter 102 when the user operates the key of the remote control transmitting device 102.

Further, a video signal reproduced by a play block 112 is inputted to one input of a first switch SW1, while a video signal from the tuner 111 is inputted to the other input of the first switch SW1, and the first switch SW1 selects either of inputted signals for outputting, and inputs the selected signal to an OSD (On Screen Display) control unit 116.

When there is an electronic program guide display instruction, the OSD control unit 116 is adapted to receive an electronic program guide data decoded from $\mu$con 113, and to on-screen display the electronic program guide. Also, a signal outputted from the OSD control unit 116 is inputted to an RF modulator 117, which modulates the carrier of a channel selected in advance. A channel signal modulated to be outputted from the RF modulator 117 is inputted to the VTR side, one input of the second switch SW2. On the other TV input side of the second switch SW2, a receiving signal from an antenna 101 is inputted. An output selected by the second switch SW2 is supplied to a television (TV) set 121.

In this respect, $\mu$con 113 is a microcomputer, which mainly controls an electronic program guide inserted in a video signal received, and fetches the electronic program guide data inserted in the vertical blanking interval (VBI) of the received video signal for a channel selected by the tuner circuit 111 to accumulate in a memory (SRAM) 115 after decoding. In this case, a slice/decode circuit 113-1 conducts waveform shaping of the electronic program guide data, and after the waveform shaping, decodes the electronic program guide data.

Although this electronic program guide data is inserted in the vertical blanking interval (VBI) for video signal, the electronic program guide data is determined to be, for example, data for seven days, and a memory 115 has such a memory capacity as to accumulate about 70 channels of electronic program guide data for seven days.

In a VTR constructed as described above, when the second switch SW2 is switched to the TV side to select the receiving signal from the antenna 101, the receiving signal from the antenna 101 is supplied to the television set 121 to display the video of a channel selected by the tuner of the television set 121. Also, when a reproducing start instruction is given to the VTR and a play block 112 starts reproducing, the first switch SW1 and the second switch SW2 are automatically switched so that the reproducing output from the play block 112 passes through the first switch SW1, and the OSD control unit 116, and is inputted to the RF modulator 117. Thus, the signal of a channel outputted from the RF modulator 117 is inputted to the television set 121 through the second switch SW2 switched to the VTR side. At this time, the television set 121 is adapted to select a channel outputted from the RF modulator 117 and to display the reproducing output.

In this case, when a reproducing stop instruction is given, the play block 112 stops the reproducing operation, and the first switch SW1 is switched so that a channel selected by the tuner 111 within the VTR is inputted to the RF modulator 117 through the first switch SW1 and the OSD control unit 116. The signal of the channel outputted from the RF modulator 117 is inputted to the television set 121 through the second switch SW2. At this time, the television set 121 is adapted to select a channel outputted from the RF modulator 117, and to display the channel selected by the tuner 111 within the VTR.

The above-described reproducing start instruction, reproducing stop instruction or the like can be given to the VTR by operating the key of the remote control transmitter 102. Information of a channel selected by the tuner 111 of the VTR, a counter value and videotape reservation information of the VTR, and the like are given to the OSD control unit 116 by $\mu$con 113 so that they can be on-screen displayed on the television set 121 by the OSD control unit 116 when there is a display instruction for them.

When it is desired to on-screen display the electronic program guide on the television set 121, the key or the like of the remote control transmitter 102 is operated to give an electronic program guide display instruction. This display instruction is received by the infrared light reception unit 114 to input the received signal to $\mu$con 113. On receipt thereof, the $\mu$con 113 decodes the electronic program guide data from the video signal selected by the tuner 111 to supply it to the OSD control unit 116. Thus, the OSD control unit 116 transmits the electronic program guide data to the RP modulator 117 to on-screen display it. Then, the signal of the channel modulated by the electronic program data in the RF modulator 117 is inputted to the television set 121 through the second switch SW2. At this time, the television set 121 is adapted to select a channel outputted from the RF modulator 117, and to on-screen-display the electronic program guide.

As described above, although the second switch SW2 is automatically switched to the VTR side when the VTR starts to play back, there is generally mostly a case where it is switched to the TV side at all times except it, and the video selected by the tuner provided for the television set is displayed.

The VTR has such problem that, if the second switch SW2 is switched to the TV side when it is desired to display the electronic program guide or when a message display request internally occurs, the electronic program guide or message cannot be displayed on the television set., In addition, it has also such problem that if the tuner in the television set is not set to select a channel outputted from the RF modulator within the VTR even if it has been switched to the VTR side, the electronic program guide or message cannot be displayed.

It is an object of the present invention to provide a video device capable of on-screen displaying the electronic program guide on a television set connected to the video device without taking into consideration the state of switching means for switching between the antenna receiving output side and the internally generated signal output side.

SUMMARY OF THE INVENTION

In order to achieve the above-described object, a reproducing device according to the present invention has, in a reproducing device provided with at least reproducing means and decoding means for decoding electronic program guide data transmitted, switching means to be switched between the antenna reception/output side, and the internally generated signal output side, and channel switching means for switching a channel of the display means, so that when an electronic program,guide display request occurs, the aforesaid switching means is automatically switched to the aforesaid internally generated signal output side, and the channel of the display means, to which the output is supplied, is automatically switched to the channel number, to which the internally generated signal output is transmitted, by the aforesaid channel switching means.

Also, in the aforesaid reproducing device, the channel switching means is adapted to switch the channel when a remote control code allocated to the display means is outputted.

Further, the channel switching means is adapted to switch the channel when a channel selection request is outputted to the display means through a control line connected to the display means.

According to the present invention as described above, when it is desired to display an electronic program guide, or when a message display request internally occurs, the switching means is automatically switched to the internally generated signal output side, and the channel of display means is automatically switched to a channel number, to which the internally generated signal output is transmitted, by the channel switching,means. Therefore, it is possible to on-screen display an electronic program guide or message on display means connected to outside irrespective of the switched state of the switching means.

BRIEF DESCRIPTION OF THE DRAWINGS

FIGS. 2A to 2C are views showing operation timing to switch a second switch in a VTR according to an embodiment of a video device of the present invention;

FIG. 3 is a view showing a menu screen to switch a RF channel in a VTR according to an embodiment of a video device of the present invention;

FIGS. 4A to 4C are views showing a data format for control line in a VTR according to an embodiment of a video device of the present invention;

FIG. 6B is a view showing a display screen for an electronic program guide.

DETAILED DESCRIPTION OF PREFERRED EMBODIMENTS

Figure 1A:
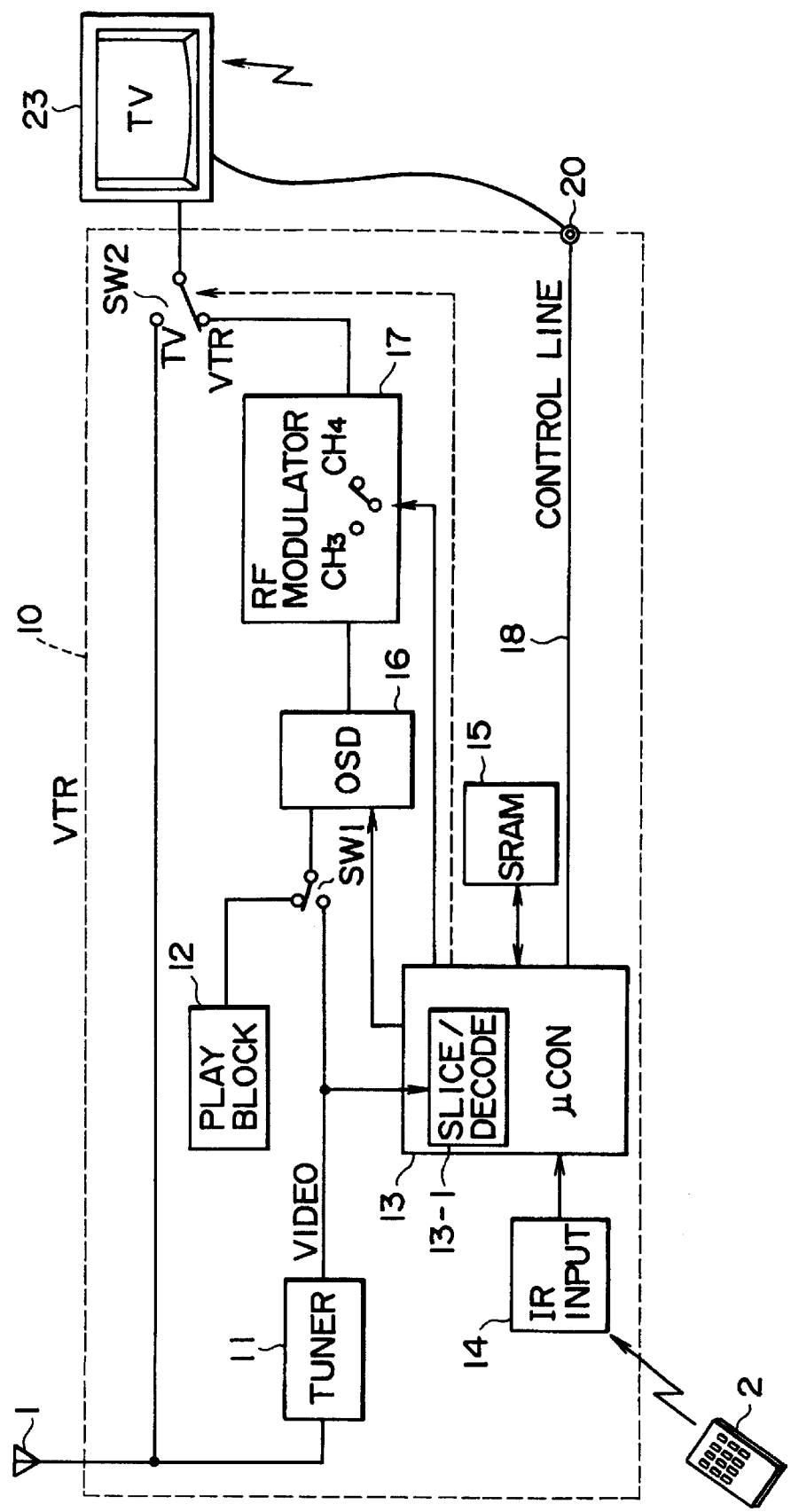
FIG. 1A is a view showing the structure of a VTR according to a first embodiment of a video device of the present invention.
Figure 1B:
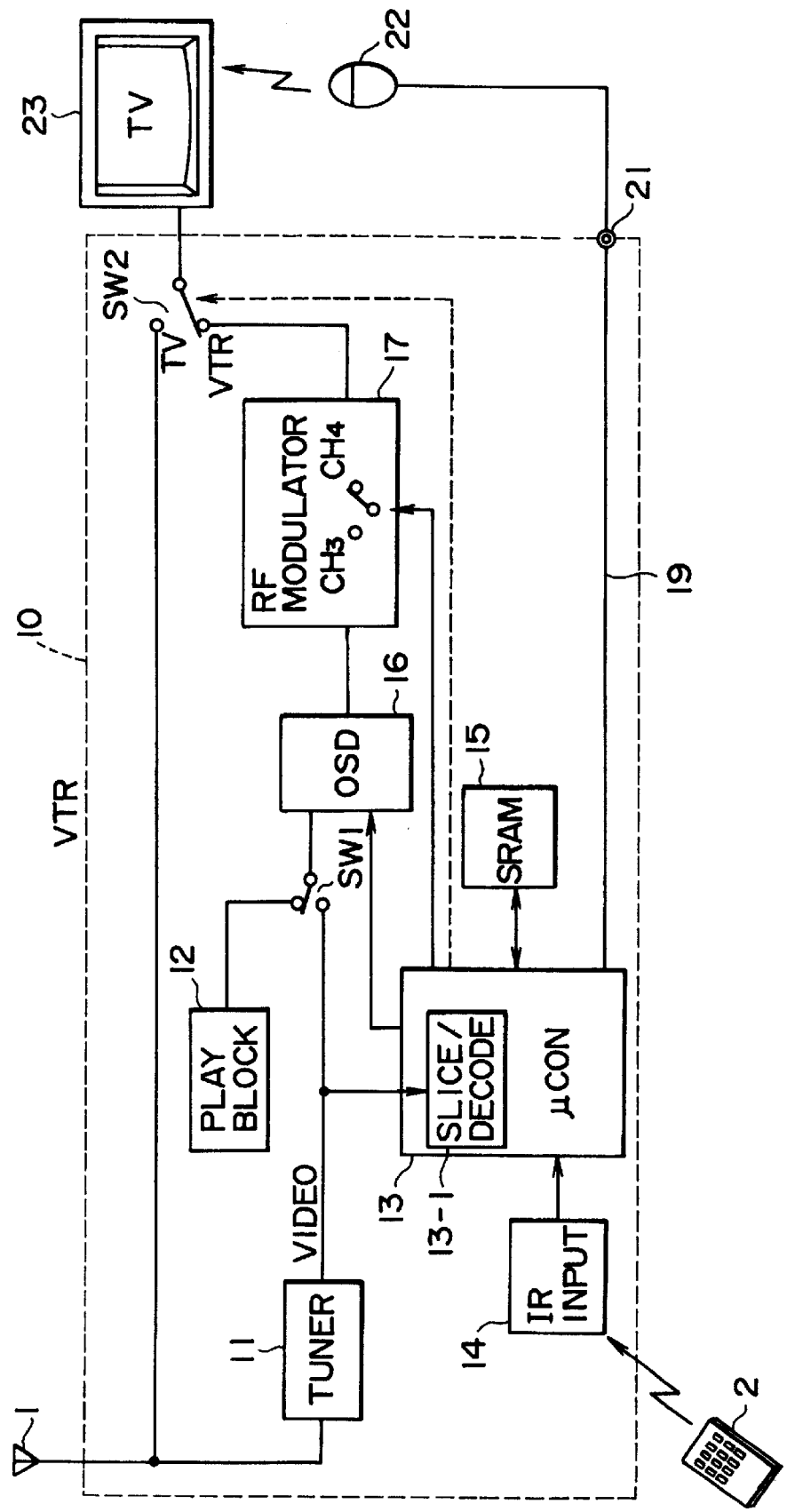
FIG. 1B is a view showing the structure of a VTR according to a second embodiment of the present invention.

FIGS. 1A and 1B is a block diagram showing the structure of a VTR according to an embodiment of a reproducing device of the present invention.

The VTR shown in this figure has a function for receiving an electronic program guide to decode it. A television broadcast signal received by the antenna 1 is inputted to the tuner circuit 11, the video signal of a channel selected by the tuner circuit 11 is inputted to a videotape unit (not shown), and is also inputted to the microcomputer device ($\mu$con) 13.

The μcon 13 has a slice/decode circuit 13-1 so that a video signal from the tuner circuit 11 is inputted to the slice/decode circuit 13-1 of μcon 13.

A remote control signal received by an infrared light reception unit 14 is inputted to the μcon 13, which controls in various ways in response to the remote control signal. In this respect, the infrared light is transmitted from a remote control transmitter 2 to the VTR when the user operates the key of the remote control transmitter 2.

Further, a video signal reproduced by a play block 12 is inputted to one input of a first switch SW1, while a video signal from the tuner 11 is inputted to the other input of the first switch SW1, and the first switch SW1 selects either of signals inputted for outputting, and it is inputted to an OSD (On Screen Display) control unit 16.

An electronic program guide signal decoded by μcon 13 or message information generated by μcon 13 is inputted to this OSD control unit 16. When these information is on-screen displayed, these information outputted from the OSD control unit 16 is inputted to a RF modulator 17 to modulate the carrier of a channel selected in advance. A channel signal to be outputted from the RF modulator 17 is inputted to the VTR side, one input of the second switch SW2.

On the other TV input side of the second switch SW2, a receiving signal from an antenna 1 is inputted. An output selected by the second switch SW2 is supplied to a television (TV) set 23.

In this respect, μcon 13 is a microcomputer, which mainly controls an electronic program guide inserted in a video signal received, and fetches the electronic program guide data inserted in the vertical blanking interval (VBI) of video signal for a channel selected by the tuner circuit 11 to accumulate in a memory (SRAM) 15 after decoding. In this case, a slice/decode circuit 13-1 conducts waveform shaping of the electronic program guide data, and after the waveform shaping, decodes the electronic program guide data.

The electronic program guide data, which has been inserted in the vertical blanking interval (VBI) and transmitted, is determined to be data for, for example, seven days, and the memory 15 has such a memory capacity as to accumulate about 70 channels of electronic program guide data for seven days, and this memory is not restricted to SRAM, but also may be memory elements other than SRAM.

The RF modulator 17 is adapted to select the carrier of either of, for example, channel CH3 and channel CH4, and this selection is adapted to be set while seeing the menu screen displayed on the television set 23.

Further, a channel switching signal for switching the channel of the television set 23 from μcon 13 is transmitted to the control line 18 or 19 (FIGS. 1A and 1B respectively). A switching signal transmitted to the line 19 in FIG. 1B is given to a luminescence unit 22, which is connected to outside of the VTR through an external terminal 21, where infrared light, which radiates in response to a remote control code allocated to the television set 23, is transmitted toward the television set 23.

Further, when the television set 23 and the VTR are connected together by the control line 18, as shown in FIG. 1A, through an external terminal 20, μcon 13 gives a channel selection request command to the television set 23 through the control line 18, and controls the channel selection of the television set 23.

When the luminescence unit 22 is connected to the external terminal 21 of the VTR, as is shown in FIG. 1B, it is not necessary to connect to the television set 23 by connecting the control line 18 of FIG. 1A to the external terminal 20 of the VTR. Also, it may be reversed, and it will suffice so long as either of external terminals 20 and 21 is used.

Next, the operation of the VTR thus constructed will be described. When the second switch SW2 is switched to the TV side to select the receiving signal from the antenna 1, the receiving signal from the antenna 1 is supplied to the television set 23 so that the video of a channel selected by the tuner within the television set 23 is displayed on the television set 23. At this time, when a reproducing start instruction is given to the VTR and the play block 12 starts reproducing, the first switch SW1 and the second switch SW2 are automatically switched as shown so that the reproducing output from the play block 12 passes through the first switch SW1, and the OSD control unit 16, and is inputted to the RF modulator 17. When the channel CH4 is selected in the RF modulator 17 as shown, the signal from the channel CH4, which has been modulated and outputted, is inputted to the television set 23 through the second switch SW2 switched to the VTR side.

In this case, when the luminescence unit 22 is connected to the external terminal 21, μcon 13 transmits a remote control code to the luminescence unit 22 to set the channel of the television set 23 to CH4. This transmission causes the luminescence unit 22 to radiate a remote control code to designate CH4 as the channel selected.

In this respect, since the remote control code for controlling the television set 23 differs with the manufacturer of the television set, it is arranged that the user can set it in advance so as to output a remote control code allocated to μcon 13.

Also, when the television set 23 is connected to the external terminal 20 of the control line 18, μcon 13 transmits a channel selection request command to the control line 18 to select CH4 as the selected channel of the television set 23. This causes the selected channel in the television set 23 to become CH4, enabling the reproduced image to be displayed on the television set 23.

FIGS. 4A to 4B show a data format on the control line 18. The μcon 13 within the VTR and the television set 23 perform serial communication by the use of the control line 18, and the serial communication is performed in synchronism with a vertical synchronizing signal (Vsync) shown in FIG. 4A. The data format is composed of status data and command data as shown in FIG. 4B. These data consist of N words as shown in FIG. 4C, and each word is composed of data of a start bit and 1 byte (eight bits). The duration of each bit is determined to be L sec, and data "0" is represented by H level, and data "1" is represented by L level.

When μcon 13 and the television set 23 conduct serial communication, if the μcon 13 outputs a first start bit, the television set 23 recognizes this start bit to receive data to be transmitted next. The μcon 13 successively outputs status data, and this status data includes ON/OFF state of power supply for the television set 23, channel selected, input information and the like. Following the status data, a command for the television set 23 is outputted. This command includes commands such as an ON/OFF request for power supply, a channel selection request, and an input switching request.

Thus, when having the television set 23 select CH 4 as described above, it will suffice if a selection request for CH 4 is outputted by μcon 13 as a command.

As another method, status data that an electronic program guide is being displayed, may be outputted to the control line 18 by μcon 13 and this status data may be recognized by the television set 23 to switch the input or channel to adapt to the VTR side.

In other words, when the television set 23 and the VTR 10 are connected together by a control line, the television set 23 may automatically switch the input to the VTR 10 side, and when connected by a RF line, a predetermined RF channel in the VTR 10 may be selected in accordance with the menu or the like of the television set 23.

Incidentally, the channel to be outputted by the RF modulator 17 can be set while seeing such a menu screen displayed on the television set 23 as shown in FIG. 3. This is an optional menu screen, on which "RF UNIT CH3 CH4" is displayed. By operating a cursor moving key to change the display color for any channel, the channel can be set. In the example shown, the display color is changed to that of CH3 to set CH3.

Also, when a reproducing stop instruction is given by a remote control transmitter 2 or the like during reproducing, the play block 12 stops the reproducing operation, and the first switch SW1 is switched so that the channel selected by the tuner 11 within the VTR is inputted to the RF modulator 17 through the first switch SW1 and the OSD control unit 16. Then, the signal of the channel outputted from the RF modulator 17 is inputted to the television set 23 through the second switch SW2.

The aforesaid reproducing start instruction, reproducing stop instruction or the like can be given to the VTR by operating the key of the remote control transmitter 2. In addition, channel information selected by the tuner 11 of the VTR, the counter value of the VTR, videotape reservation information and the like can be also on-screen displayed on the television set 23 by the control of the OSD control unit 16.

When it is desired to display the electronic program guide on the television set 23, the key or the like of the remote control transmitter 2 is operated to give an electronic program guide display instruction. This display instruction is received by the infrared light reception unit 14 to input the received signal to μcon 13. On receipt thereof, the μcon 13 decodes the electronic program guide data from the video signal selected by the tuner 11 to supply it to the OSD control unit 16 and to switch the second switch SW2 to the VTR side.

In this case, the electronic program guide data is outputted from the OSD control unit 116 and is inputted to the RF modulator 17. A signal of, for example, CH 4 to be outputted from the RF modulator 17 is inputted to the television set 23 through the second switch SW2.

At this time, the television set 23 is switched to CH 4 by a command outputted to the control line 18 or by a remote control signal transmitted from the luminescence unit 22 so that CH 4 outputted from the RF modulator 17 is selected to on-screen display the electronic program guide.

When the key of the remote control transmitter 2 is operated to turn off the display of the electronic program guide, the μcon 13 receives it to switch the second switch SW2 to the TV side, thereby stopping the display of the electronic program guide. At this time, the output of the electronic program guide data from the OSD control unit 16 is stopped.

Also, the second switch SW2 may be switched to the TV side, and the channel may be returned to the original one so that the television set 23 displays the channel before the electronic program guide is displayed through a command outputted to the control line 18 or a remote control signal transmitted from the luminescence unit 22.

By the way, when the second switch SW2 is switched to the TV side at the user's request during display of the electronic program guide so that the television set 23 displays the video from the antenna 1, and subsequently it is switched to the VTR side to display the video from the VTR, the second switch SW2 is undesirably switched to the TV side at the time of OFF command of the electronic program guide so that signals from the VTR will not be supplied to the television set 23. Thus, when the user switches the second switch SW2 during the display of the electronic program guide, the second switch SW2 is adapted not to be returned to the original state even if it is commanded to turn off the electronic program guide.

Such timing for automatic switching of the second switch SW2 is shown in FIG. 2, and will be described below.

FIG. 2A shows the ON/OFF state of the on-screen display; FIG. 2B shows the switched state between TV and VTR in the second switch SW2; and FIG. 2C shows the state of a flag 1 indicating whether or not the second switch SW2 should be returned to the original state when the display of the electronic program guide is turned off.

In FIGS. 2A to 2C, when the display of the electronic program guide is turned on (Guide ON) at time t1, the on-screen display is caused to be in a Guide ON state, and simultaneously the second switch SW2 is switched to the VTR side. Further, the flag rises. When the display of the electronic program guide is turned off (Guide OFF) at time t2, the on-screen display is turned off, and the second switch SW2 is returned to the TV side because the flag is raised.

Also, when a switching command (TV/VTR Key) of the second switch SW2 is inputted at time 4 after Guide ON is inputted at time t3, the second switch SW2 is switched to the TV side, and the flag falls. Accordingly, when the second switch SW2 is switched to the VTR side again at time 5, the second switch SW2 is not switched to the TV side even if Guide OFF is inputted at time t6, but stays on the VTR side.

Figure 5:
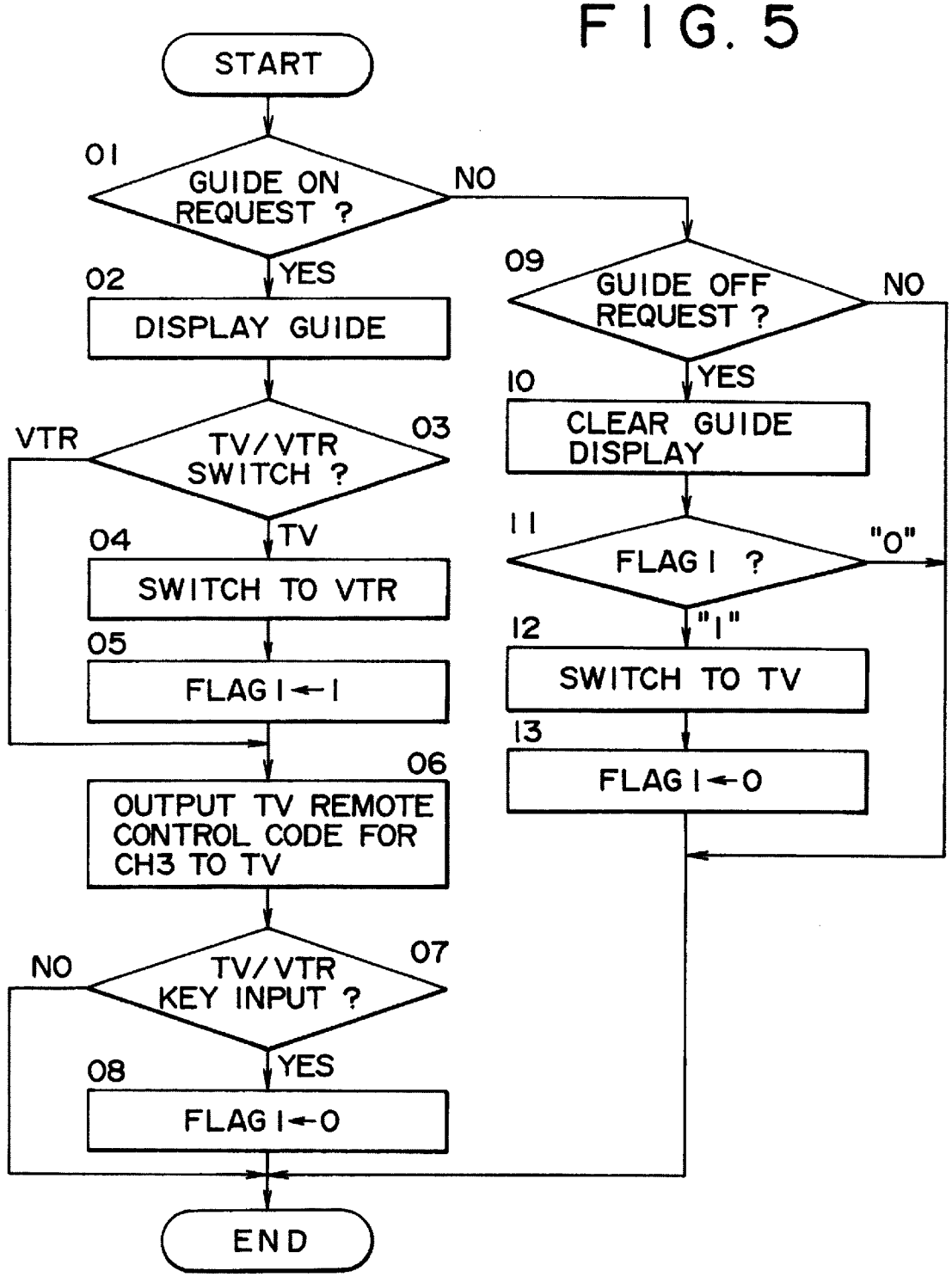
FIG. 5 is a flow chart to switch a second switch in a VTR according to an embodiment of a video device of the present invention.

FIG. 5 is a flow chart showing the switching process of the second switch SW2 which is executed by the μcon 13 when the luminescence unit 22 is connected to the VTR.

Figure 6A:
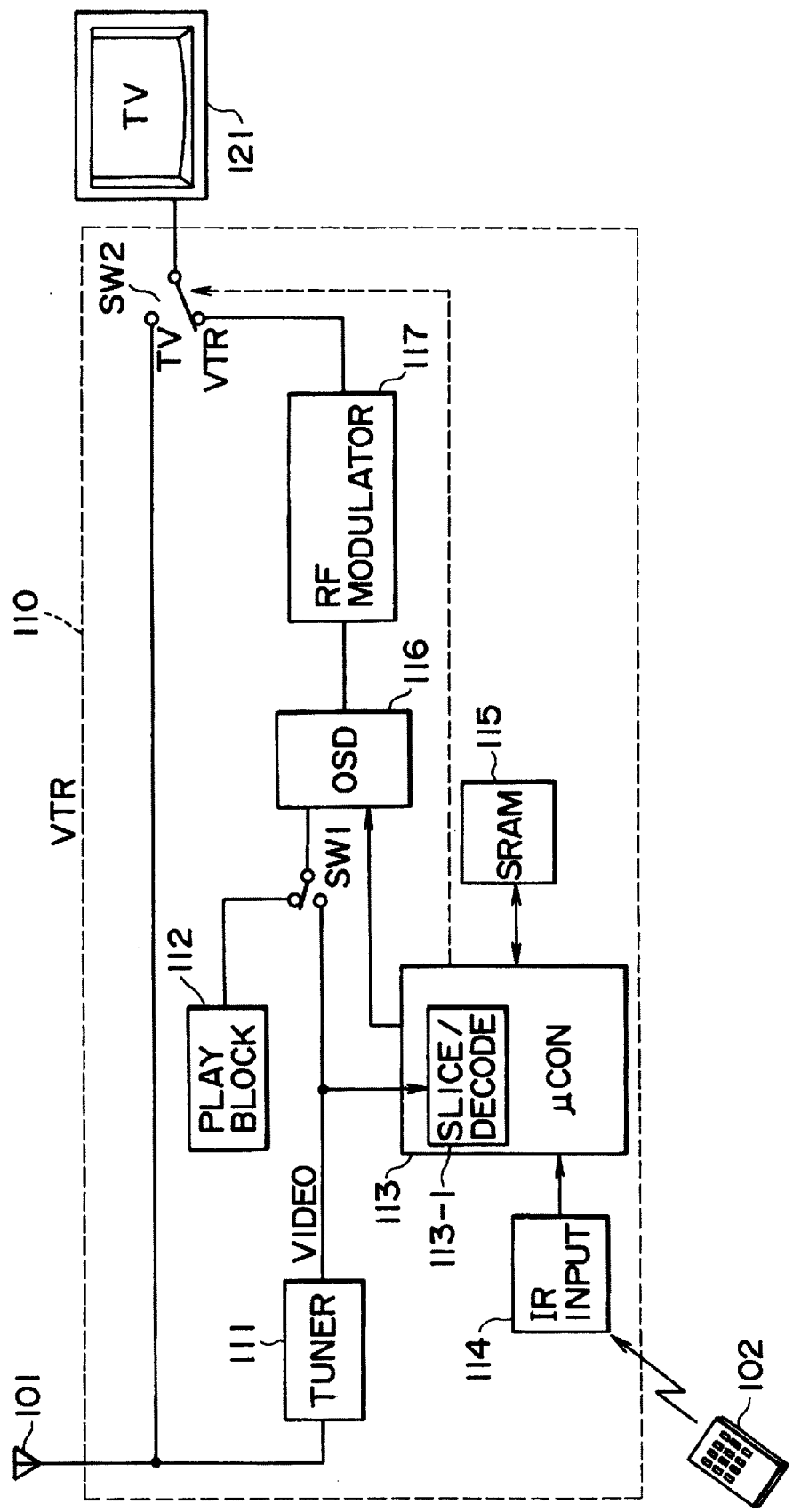
FIG. 6A is a structural view showing a conventional VTR.

This process determines at Step 01 whether or not there is an electronic program guide display request, and this is determined to be Yes when the user inputs a guide-related key or when an internal request to display a guide-related alarm message occurs. When it is determined to be Yes, a process for displaying such an electronic program guide as shown in FIG. 6B is performed at Step 02.

Next, it is determined at Step 03 whether the switched state of the second switch SW2 is on the TV side or on the VTR side, and when it is determined to be on the VTR side, the process jumps to Step 06. When it is determined to be on the TV side, the second switch SW2 is switched to the VTR side at Step 04, and further the flag 1 is set to "1" at Step 05. In this respect, the flag 1 is set to "1" because the second switch SW2 has been forcibly switched.

Then, the μcon 13 outputs a remote control code which switches the television set 23 so as to receive, for example, CH3 at Step 06 to supply it to the luminescence unit 22. This causes the receiving channel for the television set 23 to be CH3. Thus, the electronic program guide is on-screen displayed. In this respect, the RF modulator 17 is set to CH3 in this case.

Subsequently, it is determined in Step 07 whether or not the key for switching the second switch SW2 has been inputted, and when the key is inputted, it is determined to be Yes, and the flag 1 is set to "0" in Step 08 to complete the process. When the key for switching the second switch SW2 is not inputted, the process is completed as it is.

In this respect, if neither electronic program guide display request, nor input of a guide-related key, nor internal request for displaying a guide-related alarm message occurs, it is determined to be No in Step 01, and is branched to Step 09. At Step 09, it is determined whether or not there is an electronic program guide display-OFF request. This electronic program guide display-OFF request occurs when the user turns off the display of the electronic program guide by operating the guide-related key, when the display of the electronic program guide is intended to be internally turned off by timeout of screen display time, when it becomes necessary to erase the display of the electronic program guide due to change in mode such as power-off, and tape reproducing or the like.

When there is an electronic program guide display-OFF request and it is determined to be Yes, the display of the electronic program guide is cleared at Step 10. Next, it is determined at Step 11 whether the flag 1 is "1" or "0", and when it is determined to be "1", the second switch SW2 is switched to the TV side at Step 12. Then, the flag 1 is set to "0" at Step 13 to complete the process.

When the flag 1 is determined to be "0" at Step 11, the process is completed as it is.

In this respect, when the control line 18 is used, the same flow chart applies, and in this case, it will suffice if a CH3 selection request command is outputted to the control line 18 at Step 06.

Also, since the VTR side is able to know the status on the TV side in this case, when the power supply for the television set 23 is off, a CH 3 command can be transmitted after a power-ON command is transmitted. Further, when the input to the television set 23 is not set to video input, a command for switching to the tuner within the television set 23 can be also transmitted.

In the above description, the description has been made of a VTR capable of recording and reproducing as a video device, but a video device according to the present invention may be a VTR exclusively used for reproducing, and is not restricted to a VTR, but may be a video device such as DVD.

Since the present invention is constructed as described above, when an electronic program guide is displayed, or when a message display request internally occurs, the switching means can be automatically switched to the internally generated output side, and the channel of the display means can be switched to a channel number, to which the internally generated output is transmitted, by channel switching means, and therefore, the electronic program guide or message can be displayed on display means connected to outside irrespective of the switched state of the switching means.

What is claimed is:

1. In a reproducing device provided with at least reproducing means and decoding means for decoding transmitted electronic program guide data, a reproducing device comprising:

switching means for switching between an antenna reception signal provided on at least one first predetermined channel having at least one first predetermined frequency and an internally generated signal provided on a second predetermined channel having a second predetermined frequency; and channel switching means for switching a display device between said at least one first predetermined frequency and said second predetermined frequency, so that when there is an electronic program guide display request, said switching means is automatically switched to said internally generated signal, and the channel of said display device is automatically switched to said second predetermined frequency.

2. The reproducing device as defined in claim 1, wherein in said reproducing device, when a message request occurs internally, said switching means is automatically switched to said internally generated signal, and the frequency of said display device, to which said internally generated signal is supplied, is automatically switched to said second predetermined frequency by said channel switching means.

3. A reproducing device as defined in claim 1, wherein said channel switching means outputs a remote control code allocated to said display means to thereby switch the channel.

4. A reproducing device as defined in claim 1, wherein said channel switching means outputs a channel selection request to said display means through a control line connected to said display means to thereby switch the channel.

5. A reproducing device as defined in claim 4, further comprising a synchronizing signal separation circuit means for outputting said channel selection request in synchronism with a vertical synchronizing signal.

6. A reproducing device as defined in claim 1, wherein said reproducing device further has selection means for selecting the channel of said display means to which said internally generated signal is supplied.

7. A reproducing device as defined in claim 1, wherein when there is an instruction to terminate the display of said electronic program guide, said reproducing device automatically switches said switching means to said antenna reception signal.

8. A reproducing device as defined in claim 7, wherein said reproducing device has storage means for storing whether or not there was a request to switch said switching means during display of said electronic program guide, and when there is said switching request at least once during display of said electronic program guide, said switching means will not be switched even if there is an instruction to terminate said display of said electronic program guide.

9. A reproducing device as defined in claim 1, further comprising an instruction to terminate the display of said electronic program guide, resulting in said channel switching means automatically switching the frequency of said display device to said at least one first predetermined frequency that was displayed before said electronic program guide was displayed.

10. The reproducing device as defined in claim 1, further comprising an instruction to terminate the display of said electronic program guide, resulting in said reproducing device automatically switching said switching means to said antenna reception signal, and said channel switching means automatically switching the frequency of said display device to said at least one first predetermined frequency that was displayed before said electronic program guide was displayed.

11. A reproducing device as defined in claim 1, wherein when there is a request to switch said switching means during display of said electronic program guide, said reproducing device switches said switching means.

12. A recording/reproducing device provided with at least reproducing means and decoding means for decoding transmitted electronic program guide data, comprising:

switching means for switching between an antenna reception signal provided on at least one first predetermined channel having at least one first predetermined frequency and an internally generated signal provided on a second predetermined channel having a second predetermined frequency; and channel switching means for switching a display device between said at least one first predetermined frequency and said second predetermined frequency, so that when there is an electronic program guide display request, said switching means is automatically switched to said internally generated signal, and said display device is automatically switched to said second predetermined frequency.

13. The recording/reproducing device as defined in claim 12, wherein in said reproducing device, when a message request occurs internally, said switching means is automatically switched to said internally generated signal, and a channel of said display device, to which said internally generated signal is supplied, is automatically switched to said second predetermined frequency by said channel switching means.

14. A recording/reproducing device as defined in claim 12, wherein said channel switching means outputs a remote control code allocated to said display means to thereby switch the channel.

15. A recording/reproducing device as defined in claim 12, wherein said channel switching means outputs a channel selection request to said display means through a control line connected to said display means to thereby switch the channel.

16. A recording/reproducing device as defined in claim 15, further comprising a synchronizing signal separation circuit means for outputting said channel selection request in synchronism with a vertical synchronizing signal.

17. A recording/reproducing device as defined in claim 12, wherein said reproducing device further has selection means for selecting the channel of said display means to which said internally generated signal is supplied.

18. A recording/reproducing device as defined in claim 12, wherein when there is an instruction to terminate the display of said electronic program guide, said reproducing device automatically switches said switching means to said antenna reception.

19. A recording/reproducing device as defined in claim 18, wherein said reproducing device has storage means for storing whether or not there was a request to switch said switching means during display of said electronic program guide, and when there is said switching request at least once during display of said electronic program guide, said switching means will not be switched even if there is an instruction to terminate said display of said electronic program guide.

20. The recording/reproducing device as defined in claim 12, further comprising an instruction to terminate the display of said electronic program guide, resulting in said channel switching means automatically switching the channel of said display device to said at least one first predetermined frequency that was displayed before said electronic program guide was displayed.

21. The recording/reproducing device as defined in claim 12, further comprising an instruction to terminate the display of said electronic program guide, resulting in said reproducing device automatically switching said switching means to said antenna reception signal, and said channel switching means automatically switching the channel of said display device to said at least one first predetermined frequency that was displayed before said electronic program guide was displayed.

22. A recording/reproducing device as defined in claim 12, wherein when there is a request to switch said switching means during display of said electronic program guide, said reproducing device switches said switching means.

23. A reproducing method in a reproducing device provided with at least a reproducing means for reproducing data and decoding means for decoding transmitted electronic program guide data, comprising the steps of:

switching a switcher to an internally generated signal provided on a predetermined channel having a predetermined frequency when there is an electronic program guide display request; and automatically switching the channel of a display, to which said internally generated signal is supplied, to a channel having said predetermined frequency, to which said internally generated signal is transmitted.

* * * * *